US009552794B2

(12) United States Patent
Muramatsu

(10) Patent No.: US 9,552,794 B2
(45) Date of Patent: Jan. 24, 2017

(54) PRE-DISCHARGE CIRCUIT FOR MULTIPLEXED LED DISPLAY

(71) Applicant: TEXAS INSTRUMENTS INCORPORATED, Dallas, TX (US)

(72) Inventor: Yasunori Muramatsu, Osaka (JP)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 196 days.

(21) Appl. No.: 14/452,160

(22) Filed: Aug. 5, 2014

(65) Prior Publication Data

US 2016/0042719 A1 Feb. 11, 2016

(51) Int. Cl.

| | |
|---|---|
| ***G06F 3/038*** | (2013.01) |
| ***G09G 5/00*** | (2006.01) |
| ***G09G 3/32*** | (2016.01) |
| ***G09G 5/18*** | (2006.01) |

(52) U.S. Cl.

CPC *G09G 5/18* (2013.01); *G09G 3/32* (2013.01); *G09G 2310/0248* (2013.01)

(58) Field of Classification Search

CPC ..... G09G 3/32; G09G 2310/0248; G09G 5/18
See application file for complete search history.

(56) References Cited

U.S. PATENT DOCUMENTS 7,830,343 B2 * 11/2010 Chiou .................. G09G 3/3283 345/100
2002/0167478 A1 11/2002 LeChevalier
2003/0156101 A1 * 8/2003 LeChevalier ........ G09G 3/3216 345/204
2003/0173904 A1 9/2003 LeChevalier
2004/0160394 A1 8/2004 Irmer et al.
2006/0187157 A1 * 8/2006 Chang .................. G09G 3/3216 345/82
2011/0018857 A1 * 1/2011 Lai ......................... G09G 3/344 345/213
2012/0127138 A1 5/2012 Tsuchi
2014/0267211 A1 * 9/2014 Todorovich .......... G09G 3/3466 345/212

FOREIGN PATENT DOCUMENTS

EP 1169695 B1 2/2005

OTHER PUBLICATIONS

Search Report for PCT/CN2014/089889, mailed Feb. 4, 2016 (1 page).

* cited by examiner

*Primary Examiner* — Charles Hicks
(74) *Attorney, Agent, or Firm* — William B. Kempler; Chares A. Brill; Frank D. Cimino

(57) ABSTRACT

A system includes an output driver circuit configured to operate a light emitting diode (LED) display having a plurality of columns of LED devices. The output driver circuit is configured to drive a given column output for the plurality of columns of LED devices in response to being activated based on data and an driver on signal supplied to the output driver circuit. A pre-discharge circuit includes a separate discharge circuit connected to each of the column outputs. The pre-discharge circuit is configured to discharge the given column output for a predetermined period of time before the output driver circuit is activated.

17 Claims, 6 Drawing Sheets

PRE-DISCHARGE CIRCUIT FOR MULTIPLEXED LED DISPLAY

TECHNICAL FIELD

This disclosure relates to electrical circuits, and more particularly to a pre-discharge circuit for a multiplexed LED display.

BACKGROUND

In a multiplexed light emitting diode (LED) display, only one row of LEDs for the display is lit at any instant in time. In a normal mode of operation, a controller sends out data to the LED driver chips to set which LED's in the selected row will be lit. De-multiplexers are used to activate the transistor that turns on power to the selected row of LED's, such that the selected LED's in that row are lit up. Then the next row's worth of data is sent out and the next row is lit, and so forth, to light the full display. This process can happen very fast, such that, to the eye, it appears that every LED is lit at the same time.

SUMMARY

This disclosure relates to a pre-discharge circuit for a multiplexed LED display, such as to compensate for brightness differences between rows of the multiplexed LED display.

In one example, a system includes an output driver circuit configured to operate a light emitting diode (LED) display having a plurality of columns of LED devices. The output driver circuit is configured to drive a given column output for the plurality of columns of LED devices in response to being activated based on data and a driver on signal supplied to the output driver circuit. A pre-discharge circuit includes a separate discharge circuit connected to each of the column outputs. The pre-discharge circuit is configured to discharge the given column output for a predetermined period of time before the output driver circuit is activated.

In another example, a system includes a controller to control a multiplexed LED display having N rows and M columns of LED devices with N and M being positive integers. The controller selects a respective row of LED devices by asserting a separate line select signal for each of the N rows. An output driver circuit is configured to drive a given column output for the M columns of LED devices in response to being activated based on data and an output enable signal generated by the controller. A pre-discharge circuit includes a separate discharge circuit connected to each of the column outputs. The pre-discharge circuit is configured to discharge the given column output for a predetermined period of time before the output driver circuit is activated.

In yet another example, a method includes enabling a pre-discharge phase for column outputs based on receiving an output enable signal to drive a display. The method includes discharging a stored charge from a given column output of the column outputs during the pre-discharge phase. The method includes terminating the pre-discharge phase. The method includes activating the column outputs to drive the display a predetermined period of time after the pre-discharge phase has been disabled.

DETAILED DESCRIPTION

This disclosure relates to a pre-discharge circuit for a multiplexed LED display, such as to compensate for brightness differences between rows of a multiplexed LED display. To mitigate the effects of brightness differences between rows, an LED driver circuit includes an output driver circuit and a pre-discharge circuit to mitigate differences between forward voltages of LEDs in different rows (lines) of the display. The pre-discharge circuit includes a separate discharge circuit connected to each of the separate column outputs. The pre-discharge circuit is configured to discharge (e.g., sink current from) the LED for a given column output before the output driver circuit asserts the LED according to display data for a given LED. As a result, the differences between forward voltages on LEDs of adjacent rows can be reduced to help provide an even display intensity which affects brightness between adjacent rows of the LED display. The output driver circuit can drive column outputs to a multiplexed LED display having N rows and M columns of LED devices. A controller can select a respective LED display device by asserting a separate line select for each of the N rows and the output driver circuit turns on a given LED in the row via a separate column output for each of the M columns. The pre-discharge circuit can sink current from LEDs for each column output that is enabled in the LED display.

Figure 1:
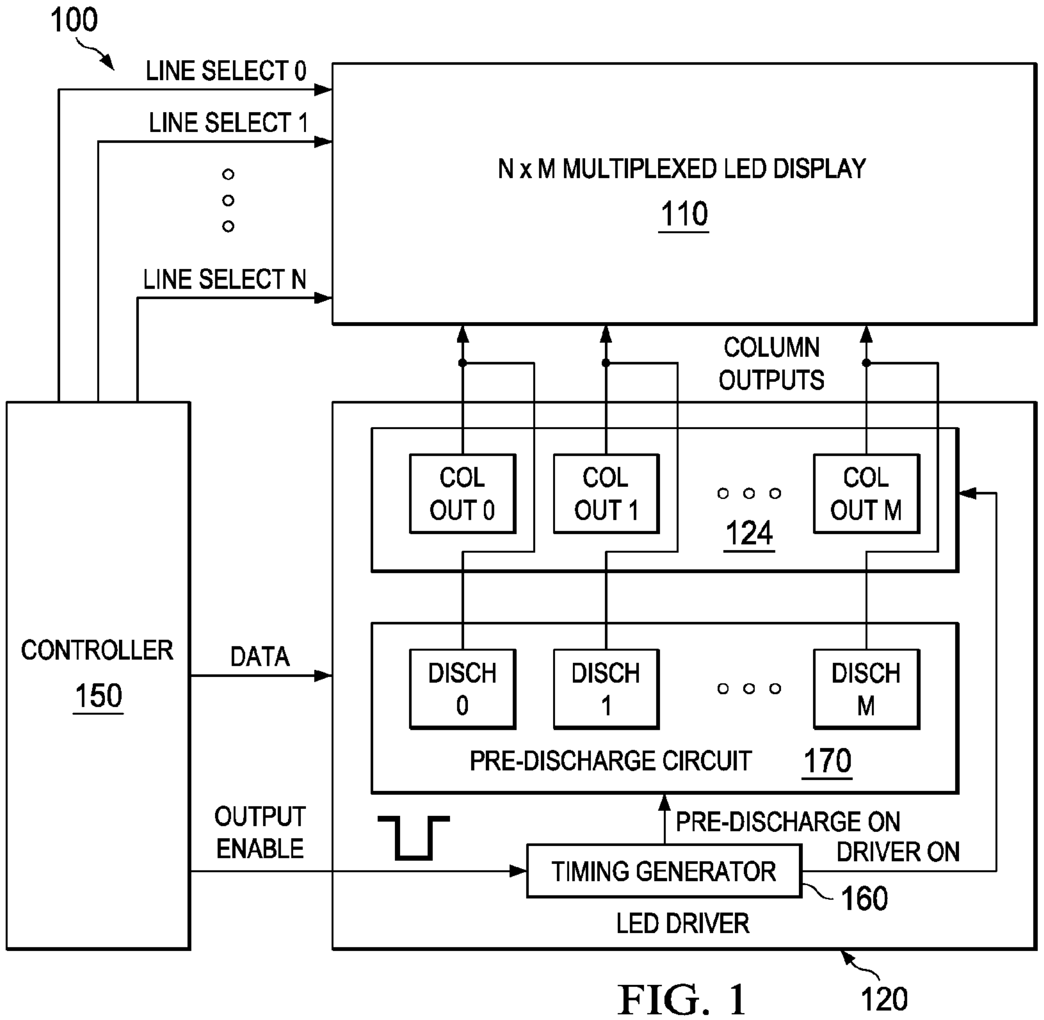
FIG. 1 illustrates an example of schematic block diagram of a system to compensate for brightness differences between rows of a multiplexed LED display.

FIG. 1 illustrates an example of a system 100 to compensate for brightness differences across a multiplexed LED display 110 caused by successive lighting of the display. The multiplexed LED display 110 can include N rows and M columns of LED display devices (See e.g., FIG. 2 for LED devices), where N and M represent positive integers, respectively. An LED driver 120 includes an output driver circuit 124 that drives column outputs COL OUT 0 though COL OUT M to the LED display 110. As used herein, the term circuit can include a collection of active and/or passive elements that perform a circuit function such as a controller 150 or LED driver 120, for example. The term circuit can also include an integrated circuit where all the circuit elements are fabricated on a common substrate, for example. The controller 150 selects a given row of LED display devices of the LED display 110 by asserting a separate line select (shown as LINE SELECT 0 through LINE SELECT N) for each of the N rows. In addition to selecting a given row of the LED display 110, the controller 150 supplies control signals, shown as DATA and OUTPUT ENABLE, to the LED driver 120. The control signals control which LED devices in the LED display 110 are turned on and control a duration of activation (e.g., brightness/intensity) in which the selected LED devices should be on.

Received DATA can be clocked serially into the LED driver 120 and supplied by a user application (e.g., memory in the controller not shown). The DATA controls whether or not a given column output COL OUT 0 though COL OUT M should turn on a given LED display device for the selected row of the LED display 110. The OUTPUT ENABLE signal is utilized for timing control in the LED driver 120, and is a pulse-width modulated signal having a pulse width to control the brightness for a given LED device. For example, the controller 150 provides a shorter pulse width OUTPUT ENABLE to the selected LED device for a dimmer LED and longer pulse width to operate the LED device more brightly.

The OUTPUT ENABLE is received by a timing generator 160 in the LED driver 120. The timing generator 160 is configured to control activation of a pre-discharge circuit 170 via a PRE_DISCHARGE ON signal. The timing generator 160 can provide a pre-discharge control signal to activate the pre-discharge circuit in response to a given column output being enabled, such that the voltage of the given column output is reduced, a pre-determined time period before the given column output is asserted by the output driver circuit (also controlled by the timing generator). The PRE_DISCHARGE ON signal thus controls the timing (e.g., when and how long) the pre-discharge circuit 170 is activated. The timing generator 160 also controls the output driver circuit 124, such as including timing and intensity of each of the respective column outputs, via a DRIVER ON signal. The pre-discharge circuit 170 includes a separate discharge circuit DISCH 0 through DISCH M connected to each of the separate column outputs COL OUT 0 though COL OUT M. The timing generator 160 can activate each pre-discharge circuit 170 to reduce parasitic capacitance voltages that may have accumulated on the respective column outputs. Such voltages can be reduced by sinking current from the LED devices in a respective column output before the column output is asserted by the output driver circuit 124.

Each of the discharge circuits DISCH 0 through DISCH M can be electrically connected with a respective one of the separate COLUMN OUTPUTS for each of the M columns. The discharge circuits DISCH 0 through DISCH M are controlled by the timing generator 160 and compensate for brightness differences between rows of the LED display 110 caused by successive lighting of the display. Compensation includes mitigating parasitic capacitance voltages that may have accumulated on the column outputs due to forward voltage across the LEDs during successive lightings of the display 110.

In one example, a transistor switch device (See e.g., FIG. 5) acting as a respective discharge circuit DISCH 0 through DISCH M may be activated (e.g., pulsed) a predetermined period of time before the respective column output circuit COL OUT 0 though COL OUT M is asserted by the timing generator 160 to activate a corresponding LED. The transistor switch device can sink current from the respective column output to cause a reduction in the accumulated parasitic voltage, such as to reduce a difference in forward voltages across adjacent LEDs connected to the respective column output.

In another example, a constant current source (See, e.g., FIG. 6) acting as a discharge circuit DISCH 0 through DISCH M may be activated a predetermined period of time before the respective column output circuit COL OUT 0 though COL OUT M is enabled by the timing generator 160, where the constant current source can sink current from the respective column output to cause a reduction in the accumulated parasitic voltage. The separate discharge circuits DISCH 0 through DISCH M associated with each of the separate column output circuits COL OUT 0 though COL OUT M reduce the parasitic capacitance voltage from a respective COLUMN OUTPUT before the respective column output signal is activated to compensate for brightness differences between rows of the multiplexed LED display 110. This can be achieved by briefly activating (e.g., pulsing) the respective discharge circuit DISCH 0 through DISCH M to draw current from the LED device (e.g., current sink) for a predetermined period of time to reduce accumulated parasitic voltages before one or more (e.g., each) of the column output circuits COL OUT 0 though COL OUT M are activated to drive a respective column of the display 110. As a result of activating the respective discharge circuit, the difference between forward voltages in LED devices being activated in adjacent rows of a given column can be reduced, thereby mitigating brightness disparities between rows of LEDs. Various timing diagrams and switching circuits will be illustrated and described below with respect to reducing the parasitic voltages as disclosed herein.

Figure 2:
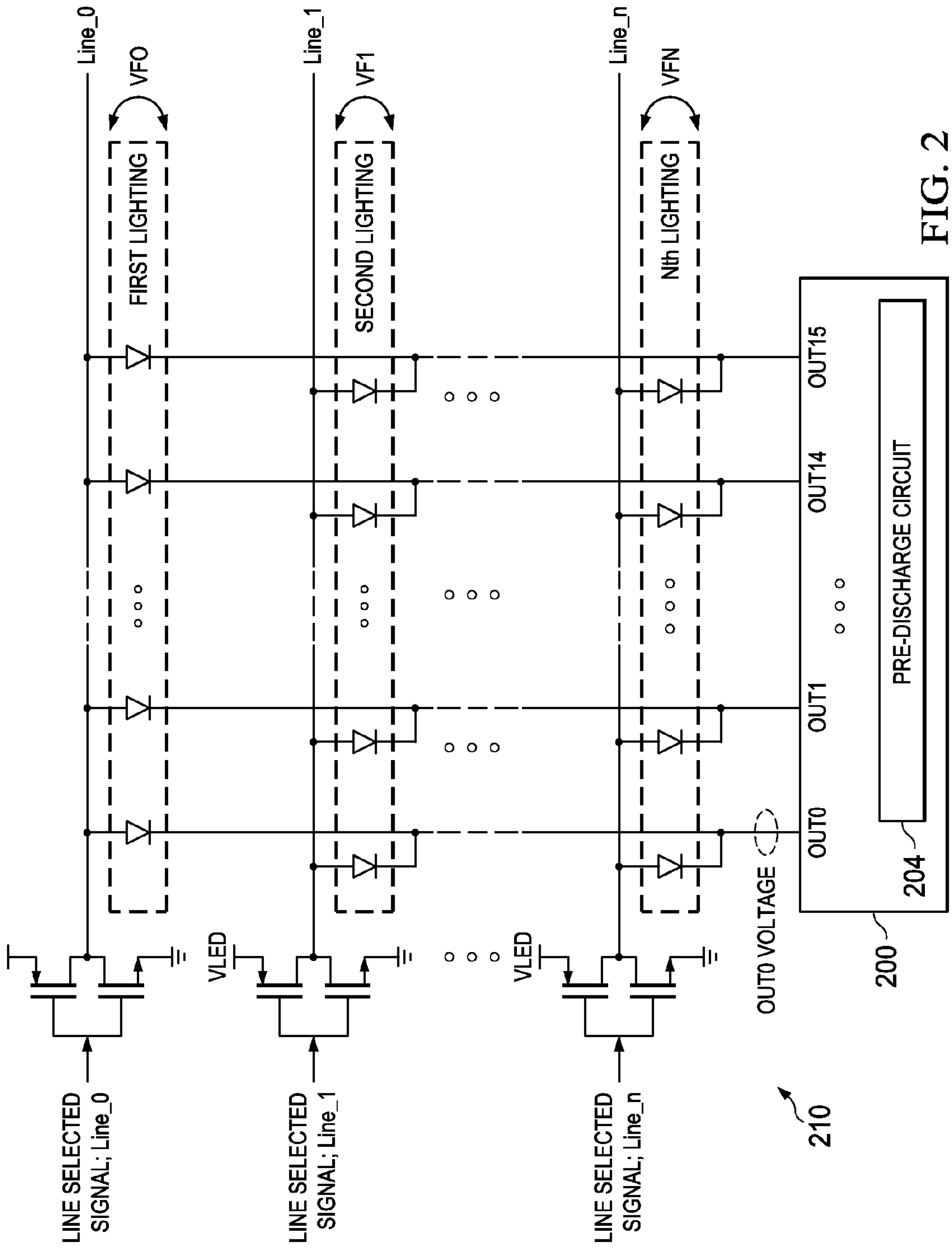
FIG. 2 illustrates an example LED driver and pre-discharge circuit to compensate for brightness differences between rows of a multiplexed LED display.

FIG. 2 illustrates an example LED driver 200 and pre-discharge circuit 204 to compensate for brightness differences between rows of a multiplexed LED display 210. In this example, the LED driver 200 includes sixteen outputs but as noted above with respect to FIG. 1, any number of M such outputs are possible. The display 210 includes N rows and shown as LINE_0 through LINE_N. Each of the N rows includes a numbers of LED display devices depending on the number of column outputs supported by the LED driver 200 (or drivers in daisy-chained example). In some examples, more than one LED driver 200 can be daisy-chained to support more column outputs to the display as illustrated and described below with respect to FIG. 9. In the example of FIG. 2, sixteen LED devices would be utilized for each row based upon the number of outputs from the LED driver 200. The LED driver 200 typically includes a driver circuit to drive the respective LED's in a given column. A controller (not shown) (See e.g., in FIG. 1) generates respective line select signals to enable LINE_0 through LINE_N for lighting. As shown, parasitic capacitance can store charge across LEDs, corresponding to forward voltages VF1 through VFN that can be accumulated across the LED's in a given row of the display 210. The forward voltage differences across LEDs further can vary between successive lightings of the display. The pre-discharge circuit 204 as described herein can be employed to mitigate such voltages and thus, even out the brightness levels between rows of the display 210.

Figure 3:
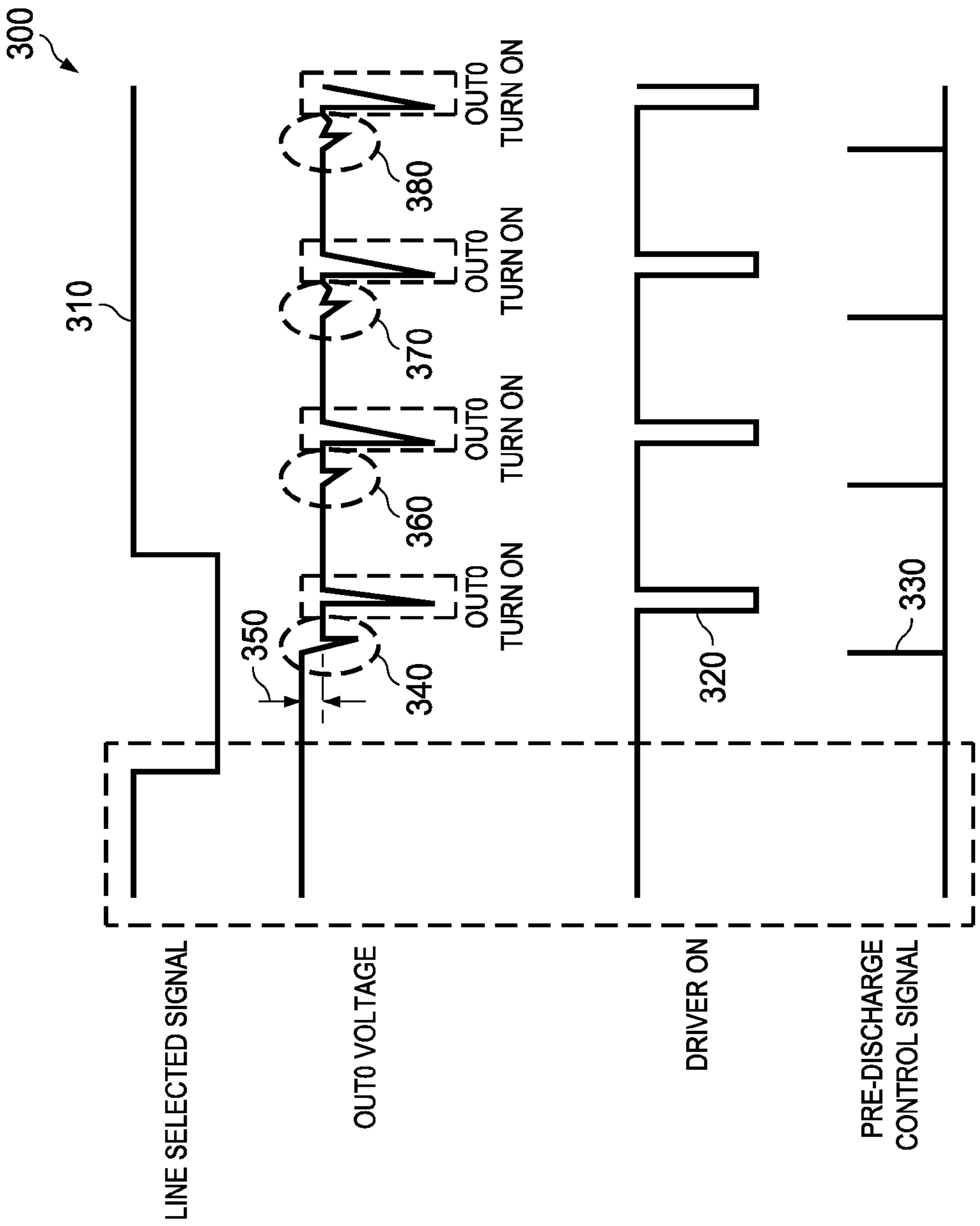
FIG. 3 illustrates an example signal and timing diagram where an example column output is asserted once per row at an example grayscale level for the controller and pre-discharge circuit described with respect to FIG. 2.

FIG. 3 illustrates an example signal and timing diagram 300 where an example column output is asserted once per row at an example grayscale level for the controller and pre-discharge circuit described with respect to FIG. 2. An example line select signal is shown at 310 and is employed to enable a given row of the display. At 320, a driver on signal is asserted each time a given output is engaged to drive a respective LED device for the display. At 330, before the driver on signal of 320 is enabled, a pre-discharge signal is generated. The pre-discharge signal reduces charge across one or more LEDs connected to a given output column before the output signal is activated to drive the given output column of the LED display.

As shown at 340, a pre-discharge pulse (e.g., pre-discharge control signal) activates the pre-discharge circuit for the given column to reduce the output voltage at such output column. The voltage reduction is illustrated between horizontal dashed line and output signal at 350. In this example, only output signal zero is shown but similar timing and performance can be implemented with respect to each of the other outputs that are not so illustrated. It is noted that subsequent pre-discharge events for output zero at 360, 370, and 380 (corresponding to different rows) do not have as great an impact on reducing accumulated parasitic voltage as the first event that occurred at 340 since most of the parasitic voltage already has been substantially reduced after the first event at 340.

Figure 4:
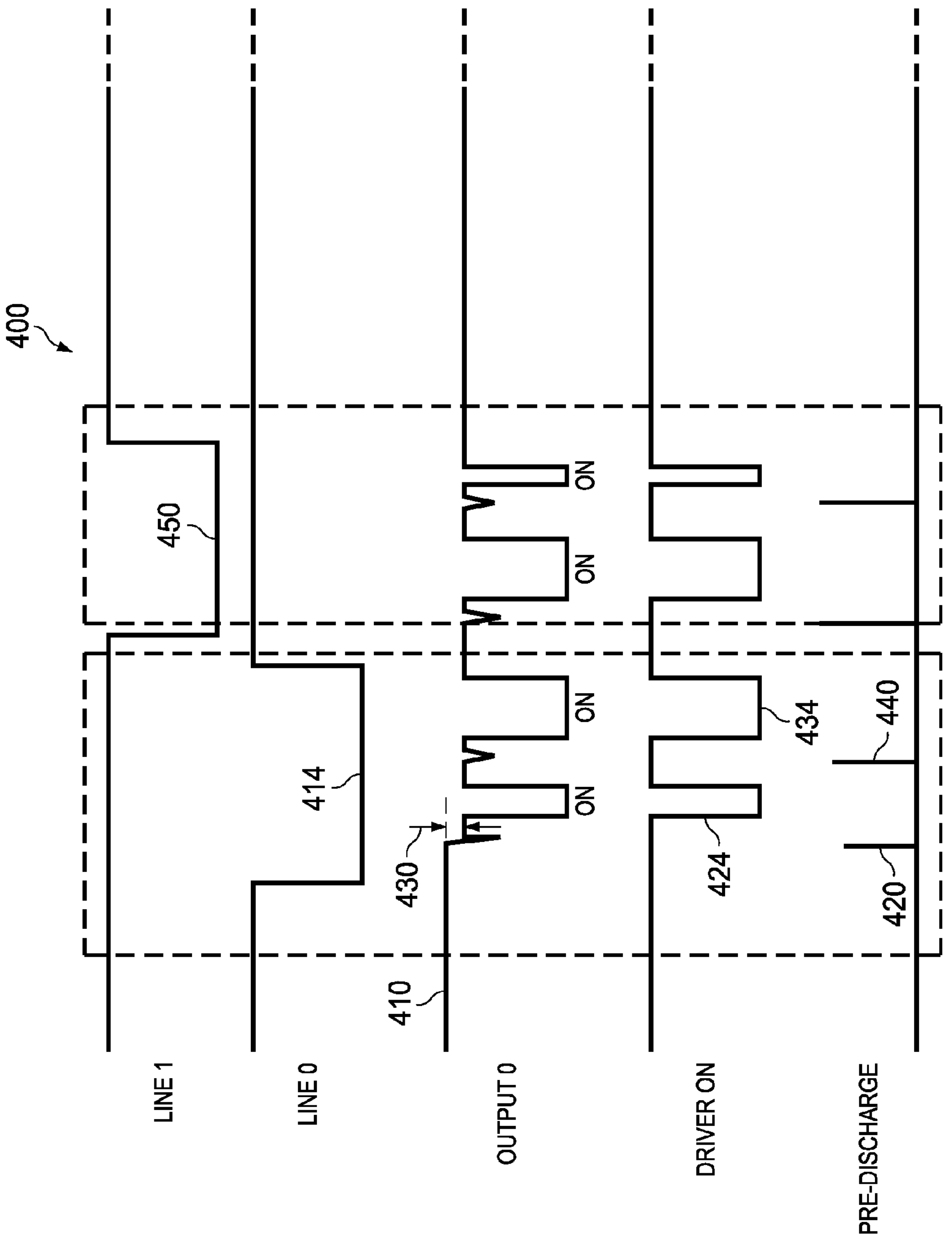
FIG. 4 illustrates an example signal and timing diagram where an example column output is asserted twice per row at different example grayscale levels for the controller and pre-discharge circuit described with respect to FIG. 2.

FIG. 4 illustrates an example signal and timing diagram 400 where an example column output 410 is asserted twice per row at different example grayscale levels for the controller and pre-discharge circuit described with respect to FIG. 2. Although, output 0 is shown in this example, similar timing and logic can apply to other outputs that are not shown depending on application data and circuit configuration. Additionally, while output 0 at 410 is shown being turned on twice per a given line select signal, more than two assertions of output 0 (or other outputs) can occur per a given line select based on the configuration of the controller and LED driver circuits described herein.

At 414, line 0 select is issued by a controller to enable a given row of a multiplexed LED display. At 420, a pre-discharge signal initiates a pre-discharge period (See FIG. 8 below for timing) before a driver on signal is asserted at 424. The pre-discharge signal at 420 has the effect of reducing a parasitic voltage shown between arrows at 430. In this example, the output enable at 424 has a narrower pulse width than a subsequent output enable 434 indicating that the first lighting of a given LED at 424 is dimmer than the second lighting at 434 which is brighter due to a longer pulse width for output enable. As shown, a second pre-discharge pulse is initiated at 440 before the driver on signal at 434. In this example however, the parasitic voltage has been substantially reduced via the first discharge pulse issued at 420. At 450, line select 1 is activated and output 0 can be similarly asserted during this period (if directed as such by application data) as described above with respect to line 0 at 414. Although not shown, other line selects, outputs, and pre-discharge pulses for the respective outputs can also be asserted.

Figure 5:
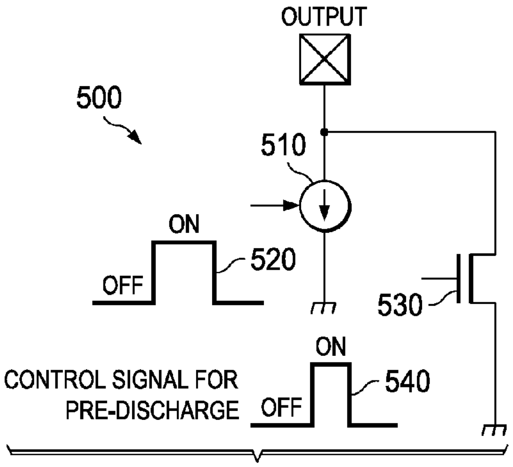
FIG. 5 illustrates an example of a switch type discharge circuit that can be employed within a pre-discharge circuit to compensate for brightness differences between rows of a multiplexed LED display.

FIG. 5 illustrates an example of a switch type discharge circuit 500 that can be employed within a pre-discharge circuit (e.g., circuit 170 of FIG. 1 or 204 of FIG. 2) to compensate for brightness differences across a multiplexed LED display. In this example, a constant current source 510 is employed to drive an OUTPUT coupled to an LED display column (not shown). An output enable signal 520 controls when the constant current source 510 is on or off. A pre-discharge transistor 530 is couple to the OUTPUT. When a pre-discharge control signal 540 is on, the pre-discharge transistor 530 sinks current from the OUTPUT and causes parasitic voltages to be reduced. The pre-discharge control signal 540 is asserted a predetermined period of time before output enable signal 520 and de-asserted before the output enable signal turns on the constant current source 510 to drive the OUTPUT.

Figure 6:
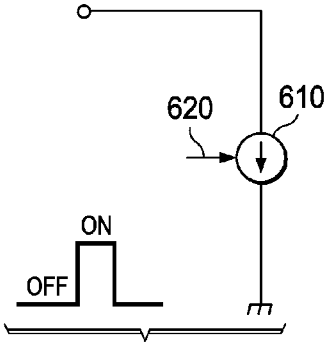
FIG. 6 illustrates an example of a constant current type discharge circuit that can be employed within a pre-discharge circuit to compensate for brightness differences between rows of a multiplexed LED display.

FIG. 6 illustrates an alternative example of a constant current type discharge circuit 610 activated by control signal 620 can be employed within a pre-discharge circuit to compensate for brightness differences across a multiplexed LED display caused by successive lighting of the display. In this example, the constant current type discharge circuit 610 can be employed as an alternative to the pre-discharge transistor depicted in FIG. 5.

Figure 7:
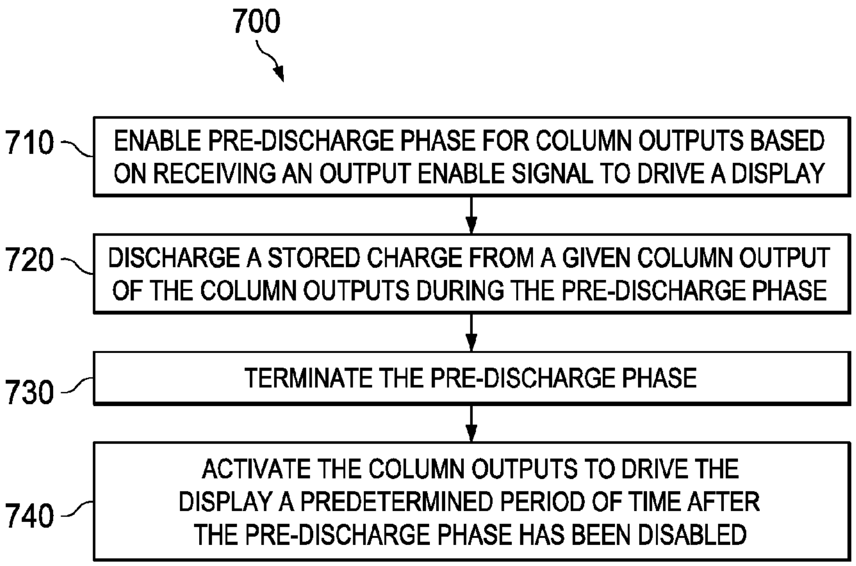
FIG. 7 illustrates an example method to compensate for brightness differences between rows of multiplexed LED display.

In view of the foregoing structural and functional features described above, a method will be better appreciated with reference to FIG. 7. While, for purposes of simplicity of explanation, the method is shown and described as executing serially, it is to be understood and appreciated that the method is not limited by the illustrated order, as some aspects could, in other examples, occur in different orders and/or concurrently with other aspects from that shown and described herein. Moreover, not all illustrated features may be required to implement a method. The various acts of the method can be executed automatically such as via a processor, computer, timing generator, and/or controller configured with executable instructions to carry out the various acts or commands described herein.

FIG. 7 illustrates an example method 700 to compensate for brightness differences across a multiplexed LED display caused by successive lighting of the display. At 710, the method 700 a method includes enabling a pre-discharge phase for column outputs based on receiving an output enable signal to drive a display (e.g., via timing generator 160 of FIG. 1). As used herein, the term phase refers to a period of time where an automated event such as generating a pre-discharge pulse can occur. For example, the pre-discharge phase can include a prescribed period of time for discharging a charge from a column output signal. At 720, the method 700 includes discharging a stored charge (e.g., parasitic voltage) from a given column output of the column outputs during the pre-discharge phase (e.g., via a control signal provided by timing generator 160 of FIG. 1). For example, the discharging can be implemented by connecting the given column output to a lower potential, such as ground, though a discharge circuit.

At 730, the method 700 includes terminating the pre-discharge phase. The termination can occur after a time period such as to reduce the parasitic voltage from the column outputs (e.g., via timing generator 160 of FIG. 1). In one example, length of the pre-discharge phase to discharge the parasitic voltage can be based on a time period (e.g., controlling a width of a pre-discharge pulse). In another example, the parasitic voltage can be monitored (e.g., via a comparator) and when the parasitic voltage is below a predetermined threshold, the pre-discharge phase can be terminated (e.g., the time period can be variable depending on the stored charge). At 740, the method 700 includes activating the column outputs to drive the display a predetermined period of time after the pre-discharge phase has been disabled (e.g., via timing generator 160 of FIG. 1).

Figure 8:
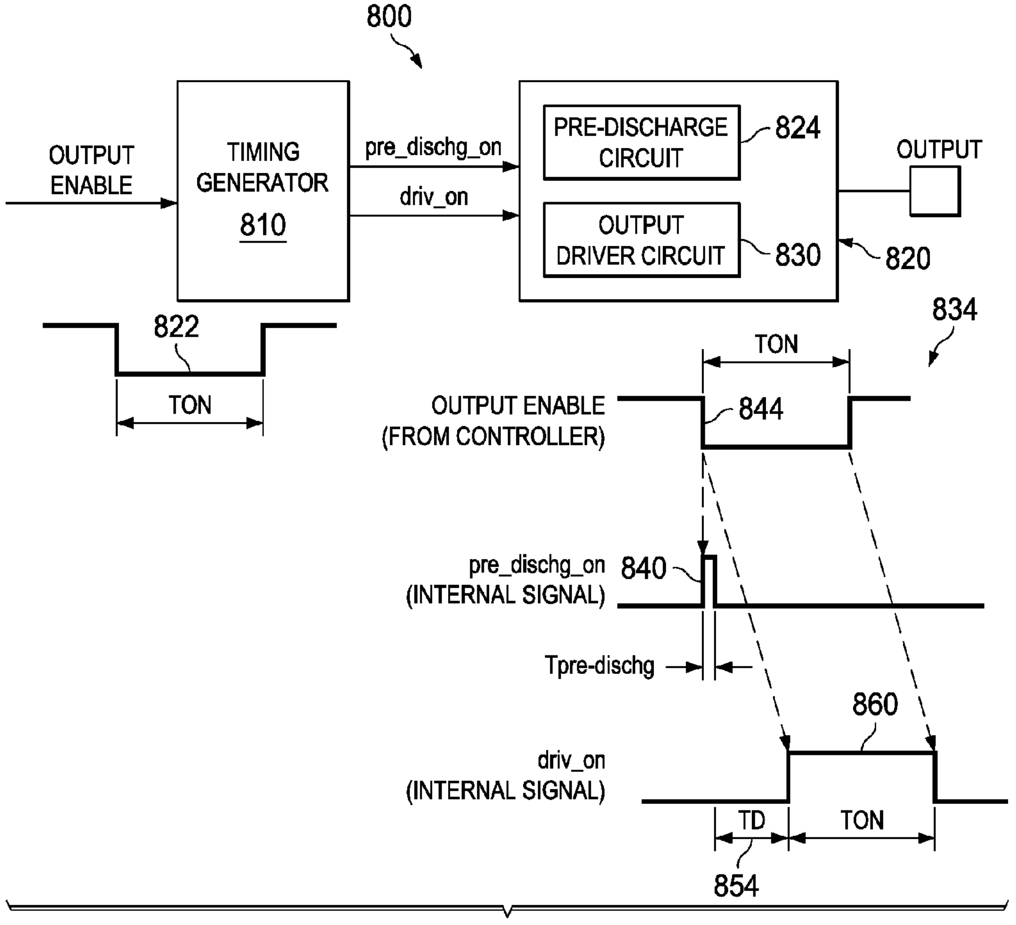
FIG. 8 illustrates an example timing generator and timing diagrams for a driver circuit.

FIG. 8 illustrates an example circuit 800 that includes timing generator 810 and driver circuit 820. In this example, an output enable signal is received by the timing generator 810. The output enable signal is generated by a controller (See, e.g., controller 150 of FIG. 1). Example timing for the output enable signal is shown as TON at 822. The timing generator 810 can generate a pre-discharge on signal to activate a pre-discharge circuit 824 in response to the output enable signal from the controller. The timing generator 810 can generate the pre-discharge on signal a predetermined period of time before an output driver circuit 830 is enabled via a driver on signal asserted by the generator. The pre-discharge circuit 824 discharges parasitic voltage from an OUTPUT, which can be coupled to a column of an LED display, before the output driver circuit 830 is activated to drive the OUTPUT as described below with respect to an example timing diagram 834.

The timing generator 810 can include logic (e.g., hardware and/or software) to generate pre-discharge pulses as described herein. The width of the pre-discharge signal (shown a Tpre-discharge) controls how long the OUTPUT is discharged. Tpre-discharge can be fixed or it can be variable (e.g., controlled based on a monitored voltage). For example, a one-shot circuit (not shown) can be employed in the timing generator 810 to generate a pre-discharge pulse shown at 840 that is triggered from the trailing edge of output enable shown at 844, for example. Also, the timing generator 810 can include counters or other timing logic (not shown) to cause a predetermined time delay shown as TD at 854. The time delay TD sets the amount of time between the falling edge of the pre-discharge pulse and the rising edge of the driv_on signal for asserting the column output, shown at 860. The time delay TD can be fixed or programmable.

Figure 9:
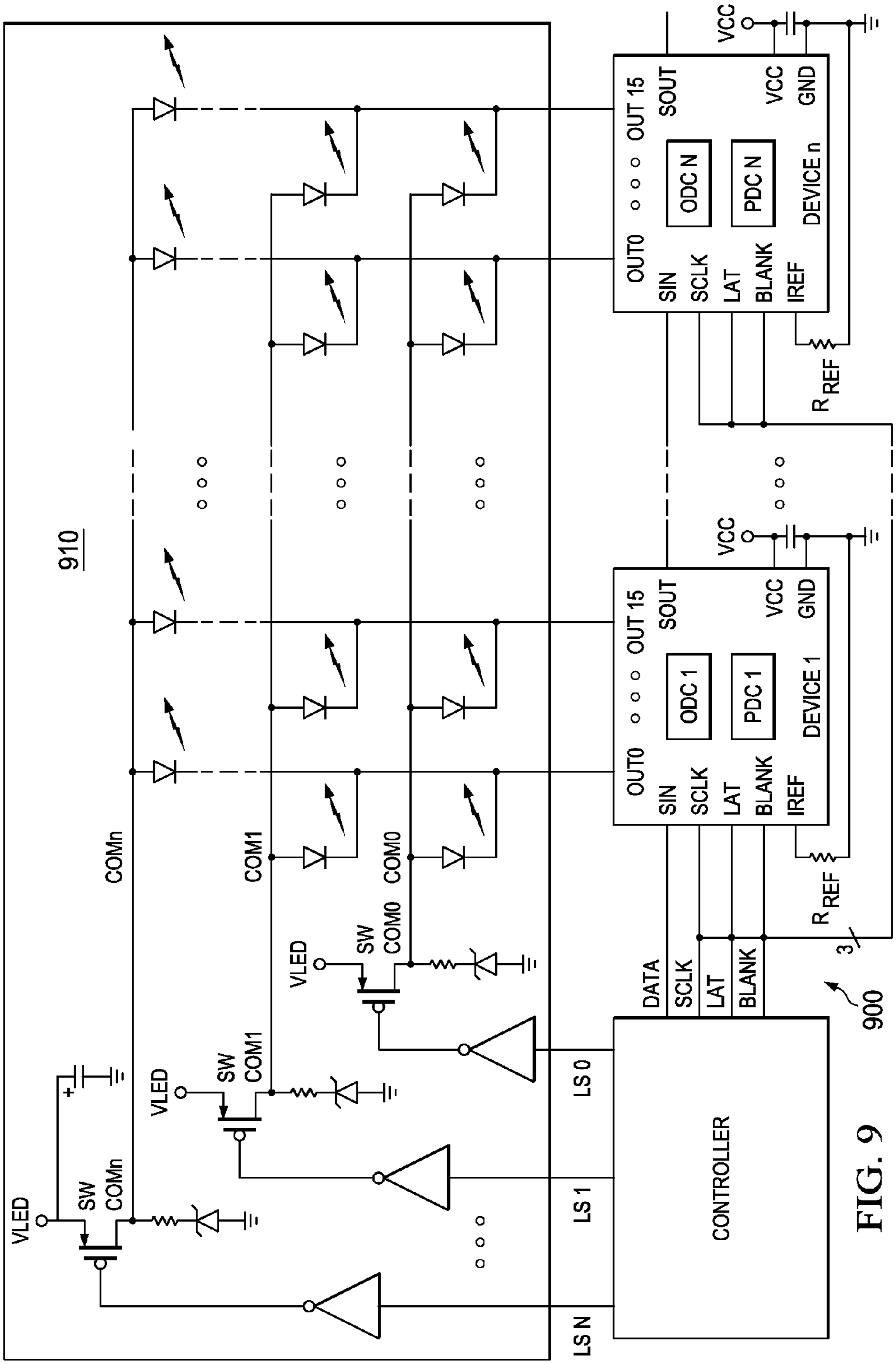
FIG. 9 illustrates another example of a system to compensate for brightness differences between rows of a multiplexed LED display with multiple LED drivers daisy-chained to support corresponding columns in the multiplexed display.

FIG. 9 illustrates an example system 900 where multiple LED drivers are daisy-chained to support more columns in a multiplexed LED display 910. In this example, a controller 920 selects N rows of display 910 via line selects shown as LS0, LS1, to LSN. Outputs from the controller 920 can include serial data, a serial clock (SCLK), data latch (LAT), and a BLANK output (described as output enable above) that can signal the respective drivers to turn off all LED devices in the display 910 concurrently. Daisy chained LED drivers 930 and 940 are shown as Device 1 and Device N, where N is a positive integer representing a number of drivers. Each LED driver 930 and 940 includes an output driver circuit (shown as ODC 1 and ODC N) and pre-discharge circuit (shown as ODC N and PDC N) to mitigate parasitic voltages at the respective column outputs of the drivers as described herein. In this daisy-chained example, data is clocked serially though each LED driver 930 though 940 until each driver has its respective data latched via LAT for its respective outputs. At that time, output enable (e.g., BLANK) can be issued to all drivers in the chain by the controller 920 which initiates the pre-discharge circuits and timings, such as described herein (e.g., via a timing generator in each LED driver).

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:

an output driver circuit configured to operate a light emitting diode (LED) display having a plurality of columns of LED devices, wherein the output driver circuit is configured to drive a given column output for the plurality of columns of LED devices in response to being activated based on data and a driver on signal supplied to the output driver circuit;

a pre-discharge circuit that includes a separate discharge circuit connected to each of the column outputs, wherein the pre-discharge circuit is configured to discharge the given column output for a predetermined period of time before the output driver circuit is activated;

further comprising a timing generator to generate the driver on signal supplied to the output driver circuit and to control a timing of activation of the output driver circuit and the pre-discharge circuit.

2. The system of claim 1, wherein each of the separate discharge circuits includes a current sink to discharge a parasitic capacitance voltage from the respective column output before the output driver circuit drives the respective column output.

3. The system of claim 2, wherein the current sink comprises a transistor switch device to discharge the parasitic capacitance voltage from the respective column output before the output driver circuit drives the respective column output.

4. The system of claim 3, wherein the current sink comprises a constant current source to discharge the parasitic capacitance voltage from the respective column output before the output driver circuit drives the respective column output.

5. The system of claim 1, further comprising a controller to generate an output enable signal that controls the driver on signal supplied to the output driver circuit and to select a plurality of rows to operate the plurality of columns of LED devices.

6. The system of claim 5, wherein the controller controls a brightness of the LED devices in the plurality of columns by controlling a pulse width of the output enable signal based on a data signal.

7. The system of claim 1, wherein the output driver circuit and the pre-discharge circuit are configured as an LED driver that is daisy-chained with at least one other LED driver.

8. The system of claim 1, wherein the timing generator generates a pre-discharge pulse to activate the pre-discharge circuit in response to an output enable signal.

9. The system of claim 8, wherein the pre-discharge pulse width comprises a predetermined period of time to control an amount of time that the column outputs are discharged by each of the separate discharge circuits.

10. The system of claim 9, wherein the timing generator delays the driver on signal supplied to the output driver circuit to delay activation of the output driver circuit for a predetermined time period after the pre-discharge pulse is generated.

11. A system, comprising:

a controller to control a multiplexed LED display having N rows and M columns of LED devices with N and M being positive integers, wherein the controller selects a respective row of LED devices by asserting a separate line select signal for each of the N rows;

an output driver circuit configured to drive a given column output for the M columns of LED devices in response to being activated based on data and an output enable signal generated by the controller; and a pre-discharge circuit that includes a separate discharge circuit connected to each of the column outputs, wherein the pre-discharge circuit is configured to discharge the given column output for a predetermined period of time before the output driver circuit is activated;

further comprising a timing generator configured to control timing of activation of the output driver circuit and the pre-discharge circuit, wherein the timing generator is configured to generate a pre-discharge control pulse signal to activate the pre-discharge circuit in response to the output enable signal.

12. The system of claim 11, wherein each of the separate discharge circuits include a current sink to discharge a parasitic capacitance voltage from the respective column output before the output driver circuit drives the respective column output.

13. The system of claim 12, wherein the current sink comprises a transistor switch device or a constant current source to discharge the parasitic capacitance voltage from the respective column output before the output driver circuit drives the respective column output.

14. The system of claim 11, wherein the pre-discharge control pulse width comprises a predetermined period of time to control an amount of time that the column outputs are discharged by each of the separate discharge circuits.

15. The system of claim 14, wherein the timing generator delays the driver on signal supplied to the output driver circuit to delay activation of the output driver circuit for a predetermined time period after the pre-discharge control pulse is generated.

16. A method, comprising:

enabling, via a timing generator, a pre-discharge phase for column outputs based on receiving an output enable signal to drive a display;

discharging, via the timing generator, a stored charge from a given column output of the column outputs during the pre-discharge phase to discharge parasitic capacitance voltage from the respective column output;

terminating, via the timing generator, the pre-discharge phase; and activating, via the timing generator, the column outputs to drive the display a predetermined period of time after the pre-discharge phase has been disabled.

17. The method of claim 16, wherein the pre-discharge phase is determined by a pre-discharge pulse width that is set for a predetermined period of time after reception of the output enable signal to control an amount of time that the column outputs are discharged.

* * * * *